(12) United States Patent
Chen

(10) Patent No.: US 10,859,886 B2
(45) Date of Patent: Dec. 8, 2020

(54) DISPLAY PANEL, DISPLAY APPARATUS AND METHOD OF MANUFACTURING DISPLAY PANEL

(71) Applicant: BOE TECHNOLOGY GROUP CO., LTD., Beijing (CN)

(72) Inventor: Juan Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 149 days.

(21) Appl. No.: 15/126,509

(22) PCT Filed: Aug. 10, 2015

(86) PCT No.: PCT/CN2015/086456
§ 371 (c)(1),
(2) Date: Sep. 15, 2016

(87) PCT Pub. No.: WO2016/141670
PCT Pub. Date: Sep. 15, 2016

(65) Prior Publication Data
US 2017/0090264 A1    Mar. 30, 2017

(30) Foreign Application Priority Data
Mar. 11, 2015  (CN) .......................... 2015 1 0105567

(51) Int. Cl.
*G02F 1/161*    (2006.01)
*G09F 9/00*     (2006.01)

(52) U.S. Cl.
CPC ................ *G02F 1/161* (2013.01); *G09F 9/00* (2013.01)

(58) Field of Classification Search
CPC .......... G02F 1/161; G02F 26/00; G02F 26/02; G02F 1/167; G02F 1/1681; G02F 1/1679;
(Continued)

(56) References Cited

U.S. PATENT DOCUMENTS 8,902,140 B2 * 12/2014 Kawamura ........... H01L 27/322
                                                        345/83
2010/0134865 A1 * 6/2010 Higuchi .................. G02F 1/163
                                                        359/273
(Continued)

FOREIGN PATENT DOCUMENTS

CN    1291289 A    4/2001
CN    1478206 A    2/2004
(Continued)

OTHER PUBLICATIONS

Third Chinese Office Action, for Chinese Patent Application No. 201510105567.X, dated Jun. 8, 2017, 12 pages.
(Continued)

*Primary Examiner* — Catherine A. Simone
(74) *Attorney, Agent, or Firm* — Kinney & Lange, P.A.

(57) ABSTRACT

A display panel includes: a first substrate; a second substrate disposed opposite to the first substrate; retaining walls disposed between the first substrate and the second substrate and each having a first end disposed on the second substrate and a second end opposite to the first end; and a material layer disposed on a side of the first substrate facing the second substrate and formed with grooves in which the second ends of the retaining walls are fitted.

16 Claims, 2 Drawing Sheets

(58) Field of Classification Search
CPC .. G02F 1/1339; G02F 1/13394; G02F 1/1341; G02F 2001/13415; G02F 1/133377; G02F 2001/13396; G09F 9/00; G02B 1/06; G02B 26/005; B32B 3/12; B32B 3/18; Y10T 428/24562; Y10T 428/24661
See application file for complete search history.

(56) References Cited

U.S. PATENT DOCUMENTS

| | | | |
|---|---|---|---|
| 2011/0299171 A1* | 12/2011 | Sato | G02B 3/14 359/619 |
| 2012/0073740 A1 | 3/2012 | Hsieh | |
| 2013/0301105 A1 | 11/2013 | Kim et al. | |
| 2014/0029080 A1 | 1/2014 | Hwang | |
| 2015/0015934 A1* | 1/2015 | Yamada | G02F 1/167 359/296 |

FOREIGN PATENT DOCUMENTS

| | | |
|---|---|---|
| CN | 102150476 A | 8/2011 |
| CN | 102375168 A | 3/2012 |
| CN | 103439790 A | 12/2013 |
| CN | 103852886 A | 6/2014 |
| CN | 104297982 A | 1/2015 |
| CN | 104658431 A | 5/2015 |
| JP | H02803 A | 1/1990 |
| JP | 2009186666 A | 8/2009 |

OTHER PUBLICATIONS

Second Chinese Office Action, for Chinese Patent Application No. 201510105567X, dated Jan. 4, 2017, 12 pages.
International Search Report and Written Opinion (including English translation of Box V.) dated Dec. 2, 2015, for corresponding PCT Application No. PCT/CN2015/086456.
First Chinese Office Action dated Aug. 22, 2016, for corresponding Chinese Application No. 201510105567.X.

* cited by examiner

DISPLAY PANEL, DISPLAY APPARATUS AND METHOD OF MANUFACTURING DISPLAY PANEL

CROSS-REFERENCE TO RELATED APPLICATIONS

This application is a Section 371 National Stage Application of International Application No. PCT/CN2015/086456, filed on 10 Aug. 2015, entitled "DISPLAY PANEL, DISPLAY APPARATUS AND METHOD OF MANUFACTURING DISPLAY PANEL", which has not yet published, which claims priority to Chinese Application No. 201510105567.X, filed on 11 Mar. 2015, incorporated herein by reference in their entirety.

BACKGROUND

1. Technical Field

Embodiments of the present invention relate to a display panel, a display apparatus comprising the display panel and a method of manufacturing a display panel.

2. Description of the Related Art

As shown in FIG. 2, a conventional display panel has retaining walls 5. The retaining walls 5 are disposed between a first substrate 1 and a second substrate 2 of the display panel and each have a first end disposed on the second substrate 2 and a second end opposite to the first end. An ink region is disposed between adjacent ones of the retaining walls 5. An ink 3 is disposed in the ink region between the retaining walls 5. During manufacturing, it is impossible for the retaining walls 5 to have completely the same height, so that there are gaps between the second ends of different retaining walls 5 and the first substrate 1. Thereby, the ink 3 in one ink region is probably circulated into an adjacent one of the ink regions to result in crosstalk or to generate bubbles. As a result, a display effect of the display panel will be greatly affected. For similar reasons, this will also affect a display effect of a display apparatus including an electronic tag, an electrochromic transparent display device and the like.

SUMMARY

Embodiments of the present invention provide a display panel, comprising: a first substrate; a second substrate disposed opposite to the first substrate; retaining walls disposed between the first substrate and the second substrate and each having a first end disposed on the second substrate and a second end opposite to the first end; and a material layer disposed on a side of the first substrate facing the second substrate and formed with grooves in which the second ends of the retaining walls are fitted.

In accordance with embodiments of the present invention, the groove has a depth of 0.1 µm-5 µm and a width of 5 µm-50 µm, and the retaining wall has a width of 5 µm-50 µm.

In accordance with embodiments of the present invention, a width of the groove is greater than a width of the retaining wall, and a difference between the width of the groove and the width of the retaining wall is less than or equal to 2 µm.

In accordance with embodiments of the present invention, a partition wall formed between adjacent ones of the grooves has a width of 100 µm-1000 µm.

In accordance with embodiments of the present invention, the material layer is made of resin.

In accordance with embodiments of the present invention, the second end of the retaining wall and the groove have substantially complementary shapes.

In accordance with embodiments of the present invention, the retaining wall has a height of 10 µm-100 µm.

In accordance with embodiments of the present invention, there is provided a display apparatus comprising the above-mentioned display panel.

Embodiments of the present invention provide a method of manufacturing a display panel, and the method comprises: providing a first substrate; providing a second substrate; forming, on the second substrate, retaining walls each having a first end disposed on the second substrate and a second end opposite to the first end, forming a material layer on the first substrate and forming, in the material layer, grooves in which the second ends of the retaining walls are to be fitted; and assembling the first substrate and the second substrate together such that the second ends of the retaining walls are fitted in the grooves.

In accordance with embodiments of the present invention, the step of forming the grooves comprises: coating a photoresist as the material layer on the first substrate; exposing the photoresist by means of a mask; and developing the exposed photoresist to form the grooves.

In accordance with embodiments of the present invention, the material layer is made of resin.

In accordance with embodiments of the present invention, the second end of the retaining wall and the groove have substantially complementary shapes.

In accordance with embodiments of the present invention, the groove has a depth of 0.1 µm-5 µm and a width of 5 µm-50 µm, and the retaining wall has a width of 5 µm-50 µm.

In accordance with embodiments of the present invention, the retaining wall has a height of 10 µm-100 µm.

In accordance with embodiments of the present invention, a width of the groove is greater than a width of the retaining wall, and a difference between the width of the groove and the width of the retaining wall is less than or equal to 2 µm.

In accordance with embodiments of the present invention, a partition wall formed between adjacent ones of the grooves has a width of 100 µm-1000 µm.

Embodiments of the present invention provide a display panel comprising: a first substrate; a second substrate; retaining walls disposed between the first substrate and the second substrate; and an ink disposed between the retaining walls, wherein a resin layer is disposed on a side of the first substrate facing the second substrate and is formed with grooves in which the retaining walls are fitted.

BRIEF DESCRIPTION OF THE DRAWINGS

The above and/or other aspects and advantages of the present invention will be apparent and more readily appreciated from the following description of embodiments taken in conjunction with the accompanying drawings, in which.

DETAILED DESCRIPTION OF THE EMBODIMENTS

Figure 1:
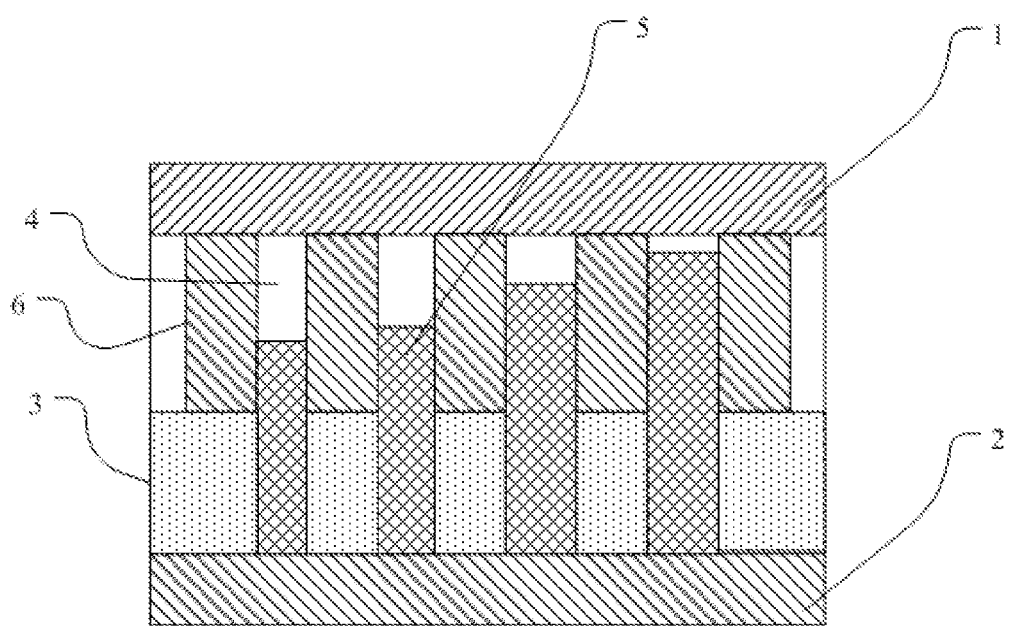
FIG. 1 is a schematic diagram showing a structure of a display panel according to an embodiment of the present invention.

A further description of the invention will be made in detail as below with reference to embodiments of the present invention taken in conjunction with the accompanying drawings. The following embodiments are intended to explain the present invention and the present invention should not be construed as being limited to the embodiment set forth herein. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. FIG. 1 is a schematic diagram showing a structure of a display panel according to an embodiment of the present invention. The display panel comprises: a first substrate 1; a second substrate 2 disposed opposite to the first substrate 1; retaining walls 5 disposed between the first substrate 1 and the second substrate 2 and each having a first end disposed on the second substrate 2 (for example, connected to the second substrate 2) and a second end opposite to the first end; an ink 3 disposed between the retaining walls 5; and a material layer 6 disposed on a side (a lower side of the first substrate as shown in FIG. 1) of the first substrate 1 facing the second substrate 2 and formed with grooves 4 in which the second ends of the retaining walls are fitted.

Figure 2:
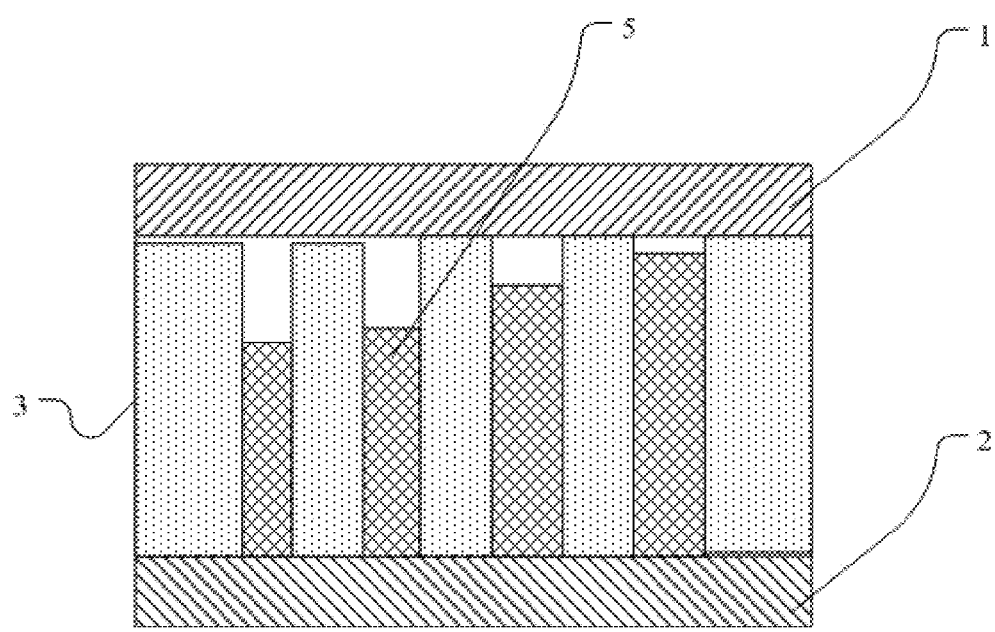
FIG. 2 is a schematic diagram showing a structure of a conventional display panel.

As shown in FIG. 1, the material layer may be made of resin. The second end of the retaining wall 5 and the groove 4 may have substantially complementary shapes. As shown in FIG. 1, different retaining walls 5 have different heights. In a conventional display panel, as shown in FIG. 2, after the first substrate 1 and the second substrate 2 are assembled, there are gaps between the retaining walls 5 and the first substrate 1 so that the ink 3 is circulated in the adjacent ink regions. As a result, crosstalk or bubbles will be generated.

In the technical solution according to the embodiments of the present invention, the grooves are formed in the material layer so that after assembling, the second ends of the retaining walls 5 are fitted in the grooves 4. In other words, the second ends of the retaining walls 5 are extended into the grooves 4. Since the grooves 4 have certain depths, all of the second ends of the retaining walls 5 having different heights can be extended into the grooves 4. The second end of the retaining wall and an inner wall of the groove form a seal structure. Thereby, the ink 3 cannot be circulated between the adjacent ink regions so as to avoid crosstalk and generation of bubbles.

In embodiments of the present invention, the groove has a depth of 0.1 μm-5 μm and a width of 5 μm-50 μm. Gaps generated due to different heights of the retaining walls can be better compensated by means of the abovementioned configuration, thereby avoiding circulation of the ink. The retaining wall may have a height of 10 μm-100 μm and a width of 5 μm-50 μm. In accordance with embodiments of the present invention, a partition wall formed between adjacent ones of the grooves has a width of 100 μm-1000 μm. A width of the groove is greater than a width of the retaining wall, and a difference between the width of the groove and the width of the retaining wall is less than or equal to 2 μm. With the abovementioned configuration, the second end of the retaining wall can be more closely fitted in the groove, preventing circulation of the ink.

With the technical solution according to the embodiments of the present invention, provisions of the grooves allow, after assembling the first substrate and the second substrate together, the second ends of the retaining walls to be fitted in the grooves, i.e., the second ends of the retaining walls are extended into the grooves, thereby avoiding, circulation of the ink between the adjacent ink regions through the gap formed between the retaining wall and the first substrate, crosstalk of the ink between adjacent pixels, and generation of bubbles.

Embodiments of the present invention also provide a display apparatus comprising the abovementioned display panel. The display apparatus comprises an electronic paper, an electronic tag, an electrochromic transparent display device and the like.

Embodiments of the present invention further provide a method of manufacturing a display panel, and the method comprises the following steps of: providing a first substrate 1; providing a second substrate 2; forming, on the second substrate 2, retaining walls 5 each having a first end disposed on the second substrate 2 and a second end opposite to the first end; forming a material layer on the first substrate 1 and forming, in the material layer, grooves 4 in which the second ends of the retaining walls 5 are to be fitted; and assembling the first substrate 1 and the second substrate 2 together such that the second ends of the retaining walls 5 are fitted in the grooves 4.

In accordance with embodiments of the present invention, the grooves 4 are formed by a single patterning process. Specifically, the step of forming the grooves comprises: coating a photoresist as a material layer on the first substrate; exposing the photoresist by means of a mask; and drying and developing the exposed photoresist to form the grooves. The photoresist may be made of resin.

For example, the groove has a depth in the range of 0.1 μm-5 μm and a width of 5 μm-50 μm, color ink is used, and the retaining wall may have a height in the range of 10 μm-100 μm and a width of 5 μm-50 μm. A partition wall formed between the grooves 4 has a width of 100 μm-1000 μm.

A specific process of forming the grooves comprises: coating a photoresist on the first substrate; after completing the coating of the photoresist, vacuum drying the photoresist, i.e., drying the photoresist at a temperature of 100° C. for 600 seconds; exposing the coated photoresist by means of a mask for 25 seconds; drying the exposed photoresist at 230° C. for 500 seconds; then developing the photoresist for 200 seconds; and finally drying the developed photoresist at 230° C. for 200 seconds to obtain the grooves. Through the abovementioned way, the display panel having the grooves can prevent crosstalk and bubbles caused due to the different heights of the retaining walls.

The embodiments of the present invention provide a display panel, a display apparatus and a method of manufacturing a display panel, thereby at least alleviating the problem that an ink in an ink region is circulated into an adjacent ink region.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents. The above contents are only the specific embodiments of the present invention. However, the protection scope of the present invention is not limited thereto.

What is claimed is:
1. A display panel comprising:
a first substrate;
a second substrate disposed opposite to the first substrate;
retaining walls disposed between the first substrate and the second substrate and each having a first end dis- posed on the second substrate and a second end opposite to the first end, at least two of the retaining walls having different heights;

a material layer disposed on a side of the first substrate facing the second substrate and formed with grooves in which the second ends of the retaining walls are fitted with the second ends of at least some of the retaining walls spaced from bottoms of corresponding ones of the grooves, such that sealed ink chambers are formed between adjacent ones of the retaining walls and between the second substrate and the material layer, wherein the second ends of the retaining walls and inner walls of the grooves form respective seal structures; and ink disposed in the sealed ink chambers, respectively.

2. The display panel of claim 1, wherein:
the grooves each have a depth of 0.1 μm-5 μm and a width of 5 μm-50 μm, and
the retaining walls each have a width of 5 μm-50 μm.

3. The display panel of claim 1, wherein:
a width of each of the grooves is greater than a width of each of the retaining walls, and
a difference between the width of each of the grooves and the width of each of the retaining walls is less than or equal to 2 μm.

4. The display panel of claim 1, wherein:
a partition wall formed between adjacent ones of the grooves has a width of 100 μm-1000 μm.

5. The display panel of claim 1, wherein:
the material layer is made of resin.

6. The display panel of claim 1, wherein:
the second end of each of the retaining walls and each of the grooves have substantially complementary shapes.

7. The display panel of claim 2, wherein:
the retaining walls each have a height of 10 μm-100 μm.

8. A display apparatus comprising the display panel according to claim 1.

9. A method of manufacturing the display panel of claim 1, the method comprising steps of:
providing the first substrate;
providing the second substrate;
forming, on the second substrate, the retaining walls;
forming the material layer on the first substrate and forming, in the material layer, the grooves; and
assembling the first substrate and the second substrate together such that the second ends of the retaining walls are fitted in the grooves with the second ends of at least some of the retaining walls spaced from bottoms of corresponding ones of the grooves, such that the sealed ink chambers are formed between adjacent ones of the retaining walls and between the second substrate and the material layer, the ink is disposed in the sealed ink chambers, respectively, and the second ends of the retaining walls and inner walls of the grooves form respective seal structures.

10. The method of claim 9, wherein:
the step of forming the grooves comprises:
coating a photoresist as the material layer on the first substrate;
exposing the photoresist by means of a mask; and
developing the exposed photoresist to form the grooves.

11. The method of claim 9, wherein:
the material layer is made of resin.

12. The method of claim 9, wherein:
the second end of each of the retaining walls and each of the grooves have substantially complementary shapes.

13. The method of claim 9, wherein:
the grooves each have a depth of 0.1 μm-5 μm and a width of 5 μm-50 μm, and
the retaining walls each have a width of 5 μm-50 μm.

14. The method of claim 13, wherein:
the retaining walls each have a height of 10 μm-100 μm.

15. The method of claim 9, wherein:
a width of each of the grooves is greater than a width of each of the retaining walls, and
a difference between the width of each of the grooves and the width of each of the retaining walls is less than or equal to 2 μm.

16. The method of claim 9, wherein:
a partition wall formed between adjacent ones of the grooves has a width of 100 μm-1000 μm.

* * * * *